United States Patent [19]

Ball et al.

[11] Patent Number: 4,831,077

[45] Date of Patent: May 16, 1989

[54] NOVEL-HEAT RESISTANT ADHESIVES

[75] Inventors: Peter Ball, Emmerting; Rudolph Weissgerber, Burghausen, both of Fed. Rep. of Germany

[73] Assignee: Wacker-Chemie GmbH, Fed. Rep. of Germany

[21] Appl. No.: 241,009

[22] Filed: Sep. 2, 1988

Related U.S. Application Data

[63] Continuation-in-part of Ser. No. 27,514, Mar. 18, 1987, abandoned, continuation of Ser. No. 804,283, Dec. 3, 1985, abandoned.

[30] Foreign Application Priority Data

Dec. 20, 1984 [DE] Fed. Rep. of Germany ....... 3446565

[51] Int. Cl.$^4$ ............................................. C08L 33/00
[52] U.S. Cl. .................................... 524/820; 524/819; 526/307.5; 526/307.8; 526/317.1
[58] Field of Search ............................. 524/819, 820; 526/307.5, 307.8, 317.1

[56] References Cited

U.S. PATENT DOCUMENTS 4,322,516  3/1982  Wiest et al. ...................... 526/307.7

Primary Examiner—Joseph L. Schofer
Assistant Examiner—J. M. Reddick
Attorney, Agent, or Firm—Bierman and Muserlian

[57] ABSTRACT

An aqueous adhesive dispersion containing, based on the total weight of the dispersion, 40 to 65% by weight of a copolymer formed by radical copolymerization of ethylene, acrylic esters having alkyl groups of 4 to 12 carbon atoms, vinyl acetate, ethylenically unsaturated carboxylic acid, ethylenically unsaturated hydroxyalkyl functional compounds, (meth-)-acrylamide and, optionally, other mono- or poly-ethylenically unsaturated compounds, using emulsion polymerization and having a glass-transition temperature of from $-20°$ to $-60°$ C. and a K value of from 50 to 180 characterized in that the copolymer was produced from:

(a) 5 to 25% by weight of ethylene,
(b) 95 to 75% by weight of comonomer mixture comprising
  (b1) 40 to 64% by weight of acrylic ester(s),
  (b2) 33 to 55% by weight of vinyl acetate,
  (b3) 1 to 5% by weight of ethylenically unsaturated carboxylic acids,
  (b4) 1 to 8% by weight of ethylenically unsaturated hydroxyalkyl functional compounds,
  (b5) 0.05 to 0.8% by weight of at least one member of the group consisting of acrylamide and methacrylamide,
  (b6) 0 to 2% by weight of other mono- or poly-ethylenically unsaturated compounds in the presence of 1–6% by weight, based on the comonomer mixture, of an emulsifier with not more than 50% of component (b1) being initially added and all of (b5) is initially added and each of components (b2) and (b3) being introduced all initially or is partially metered in and all of component (b4) is metered in during the polymerization having excellent adhesion to a plurality of substrates at elevated temperatures.

4 Claims, No Drawings

NOVEL-HEAT RESISTANT ADHESIVES

PRIOR APPLICATION

This application is a continuation-in-part of U.S. pat. application Ser. No. 027,514 filed Mar. 18, 1987, now abandoned, which is a continuation of U.S. pat. application Ser. No. 804,283 filed Dec. 3, 1985, now abandoned.

STATE OF THE ART

U.S. Pat. No. 4,322,516 describes adhesives based on aqueous dispersions of a copolymer of ethylene, acrylic acid esters of alcohols of 4 to 12 carbon atoms, vinyl acetate, and, optionally substituted methacrylamide and/or acrylamide, and, optionally other olefinically unsaturated monomers that are miscible with water in any desired ratio, or monomer-soluble or poly-olefinically unsaturated monomers. The glass-transition temperatures of the copolymer are in the range of −20° to <60° C. and the K value according to Finkentscher, measured in tetra-hydrofuran, is in the range of from 50 to 180. These known adhesives have outstanding cohesive properties, but their adhesiveness to some substrates, for example glass and similar substrates, is often unsatisfactory, especially when there is an increase in temperature.

OBJECTS OF THE INVENTION

It is an object of the invention to provide an adhesive dispersion which while maintaining the other advantageous properties of these known adhesives, form an adhesive film which also has a very good or even excellent adhesion to a plurality of substrates, for example glass and similar substrates, even at elevated temperature, for example up to 100° C., especially up to 60° C.

It is another object of the invention to provide a novel process for the preparation of the said aqueous adhesive dispersion.

These and other objects and advantages of the invention will become obvious from the following detailed description.

THE INVENTION

The aqueous adhesive dispersion of the invention contains, based on the total weight of the dispersion, 40 to 65% by weight of a copolymer formed by radical copolymerization of ethylene, acrylic esters having alkyl groups of 4 to 12 carbon atoms, vinyl acetate, ethylenically unsaturated carboxylic acids, ethylenically unsaturated hydroxyalkyl functional compounds, (meth-)-acrylamide and, optionally, other mono- or poly-ethylenically unsaturated compounds, using emulsion polymerization and having a glass-transition temperature of from −20° to −60° C. and a K value of from 50 to 180 characterized in that the copolymer was produced from:
(a) 5 to 25% by weight of ethylene,
(b) 95 to 75% by weight of comonomer mixture comprising
 (b1) 40 to 64% by weight of acrylic ester(s),
 (b2) 33 to 55% by weight of vinyl acetate,
 (b3) 1 to 5% by weight of ethylenically unsaturated carboxylic acids,
 (b4) 1 to 8% by weight of ethylenically unsaturated hydroxyalkyl functional compounds,
 (b5) 0.05 to 0.8% by weight of a least one member of the group consisting of acrylamide and methacrylamide
 (b6) 0 to 2% by weight of other mono- or poly-ethylenically unsaturated compounds
in the presence of 1–6% by weight, based on the comonomer mixture, of an emulsifier with not more than 50% of component (b1) being initially added and all of (b5) is initially added and each of components (b2) and (b3) being introduced all initially or is partially metered in and all of component (b4) is metered in during the polymerization.

The copolymers and the adhesive dispersions of the invention are prepared by radical polymerization of comonomer mixture (b), in the amounts indicated, under an ethylene pressure of preferably 20 to 100 bar and preferably at 30 to 80° C. in a pressure vessel in the presence of 1 to 6% by weight, based on the comonomer mixture, of emulsifiers, at least some of components (b1) preferably being metered in during the polymerization.

The acrylic esters of alcohols of 4 to 12 carbon atoms are suitable as component (b1) and it is preferable to use n-butyl acrylate and/or ethylhexyl acrylate. The amounts by weight used, in each case based on the total weight of the comonomer mixture and together in each case adding up to a total of 100% by weight, are from 40 to 64% by weight, preferably from 40 to 60% by weight. The vinyl acetate, component (b2), is polymerized in amounts of 33 to 55% by weight, preferably, in amounts of 33 to 50% by weight.

Component (b3), used in amounts of from 1 to 5% by weight, comprises ethylenically unsaturated carboxylic acids, preferably α,β-2,3unsaturated carboxylic acids, especially acrylic acid and/or methacrylic acid, more especially acrylic acid.

The problem of providing a heat-resistant adhesive is surprisingly solved by including in the copolymer, in combination with the monomeric units of components a and b and in the narrow quantitative ratios, units derived from ethylenically unsaturated hydroxyalkyl functional compounds. This component (b4), especially 2-hydroxyethyl acrylate and 2-hydroxypropyl acrylate, are in amounts of from 1 to 8% by weight, preferably in amounts of from 3 to 7% by weight.

As component (b5), there is used acrylamide and/or methacrylamide, preferably acrylamide, in amounts of from 0.05 to 0.8% by weight, preferably from 0.05 to 0.5% by weight.

As component (b6) there may be mentioned especially ethylenically unsaturated sulfates and/or sulfonates, especially alkali metal salts of vinylsulfonic acid as well as poly-unsaturated compounds, especially divinyl adipate. It is also possible to use other monomer-soluble comonomers such as vinyl ether, vinyl pyrrolidone, etc if any. It is preferred to use only water-soluble comonomers which serve to stabilize the dispersion, and preferably only in the smallest possible amounts.

The polymerization is carried out in customary pressure vessels and the addition of at least part of those comonomers which are rapidly incorporated into the polymer is preferably delayed by metering them in. For example, preferably at least 50% by weight of component (b1) is not metered in until during the polymerization reaction. All of component (b2) can be introduced initially or some of it can be metered in, but it is preferable to introduce all of it initially. Likewise, all of component (b3) can be introduced initially or metered in. In a preferred embodiment, it is divided in a weight ratio of 1:5 to 5:1 between initially introduced monomer and metered-in monomer. While component (b5) can only be introduced initially, it is preferable to meter in all of component (b4) as this especially advantageously influences the rheology and stability of the dispersion. All the metering in is preferably effected at approximately the rate of consumption of the individual components.

The ethylene pressure established at the start of polymerization can be kept constant over the entire duration of the reaction, for example by introducing ethylene. It is also possible, however, not to add to the ethylene initially introduced into the reactor or to vary the ethylene pressure within the stated limits during polymerization. It is preferable to establish a specific ethylene pressure before the start of polymerization and to supply no further ethylene to the reactor during the reaction. It is also possible to carry out after-(post) polymerization in customary manner.

The polymerization is carried out with initiation by customary water-soluble radical formers which are preferably used in amounts of from 0.03 to 3% by weight, based on the total weight of the comonomers. Persulfates, hydroperoxides and perphosphates, for example ammonium and potassium persulfate and tert.-butylhydroperoxide may be especially mentioned. It is preferable in this instance to activate the radical formers using reducing agents, especially formaldehyde sulfoxylate, one or both redox catalyst components preferably being metered in during polymerization.

The polymerization reaction is carried out at the pH value of preferably from 3 to 5 in the presence of customary emulsifiers, especially alkyl and alkaryl ethoxylates which optionally additionally contain a sulfate, phosphate, succinate or sulfonate group, and are used in amounts of preferably from 2 to 5% by weight. The emulsifiers can either be introduced initially or at least some of them can be metered in. To control the pH value, acids such as formic acid, acetic acid, hydrochloric acid, sulfuric acid or bases such as ammonia, amines, sodium hydroxide solution, potassium hydroxide solution, calcium hydroxide, or customary buffer salts such as alkali metal acetates, alkali metal carbonates or alkali metal phosphates may be added.

To control the molecular weight, it is possible to add known control agents, for example mercaptans, aldehydes or hydrogen chloride during the polymerization.

In respect of the use and, if desired, the preparation of the adhesive dispersions according to the invention, reference is made to U.S. Pat. No. 4,322,516.

TEST METHODS

The following table of measured values shows the results of testing the peel strength or resistance to peeling under the action of heat, the surface adhesiveness or tack, the peel strength or resistance to peeling (adhesive strength) and the shear strength or shear-resistance of adhesive coatings made with the dispersions of the invention. The term "adhesive strips" denotes strips of fexible, sheet-like carrier material coated with a film of a dispersion of the invention.

The following methods of determination were used:

(a) Resistance to peeling under the action of heat:

An area of 5×5cm2 of an adhesive strip measuring 5×8 cm2 was placed on a crystal glass plate and pressed onto the plate with a 2.2 kg steel roller coated with silicone rubber which was rolled backwards and forwards twice. The adhesive strip was stuck on in such a manner that its free end projected beyond the glass plate on one longitudinal side. A weight of 50 g was immediately attached to the free end of the adhesive strip and the glass plate, with the adhesive strip that had been stuck on facing downwards, was fixed in a drying cabinet preheated to 50° C. so that there was an angle of 90° between the end of the adhesive strip that had been stuck on the free end. The weight was attached so that its force acted evenly over the entire width of the adhesive strip. The time it took for a 1 cm section of the adhesive strip to peel off under a constant load of 50 g at 50° C. was determined. This was calculated as follows: the peeled section was measured after a suitable test period, and a quotient was formed from the test time in minutes and the peeled section in centimeters. The values given are in each case average values from three individual measurements.

(b) Surface adhesiveness:

An adhesive strip, 20 cm long and 2.5 cm wide (carrier material 0.1 mm thick PVC containing a polymer-plasticizer) was clamped in the upper jaws of a machine for testing adhesiveness in the form of a "loop" hanging down vertically with the adhesive layer outwards. 3 cm of the "loop" were placed, without the applicatioin of pressure, onto a carefully cleaned, horizontally secured glass plate by bringing the jaws of the machine for testing adhesiveness vertically together at a speed of 100 mm/minute. The adhesive strip was then immediately removed from the glass surface at the same speed and the maximum force required to pull off the "loop" was used as a measure of the surface adhesiveness. The value given was the average of five individual measurements, a fresh adhesive strip and a fresh glass surface being used each time.

(c) Resistance to peeling (adhesive strength):

Starting at one end, approximately 12 cm of a 20 cm long and 2.5 cm wide adhesive strip were placed on a carefully cleaned, crystal glass plate without forming any air pockets. A 2.2 kg steel roller coated with silicone rubber was rolled over the adhesive strip 5 times (backwards and forwards) to press the strip onto the glass plate. After being stored for 8 minutes and 24 hours, respectively, in an air-conditioned room at 23° C. and 50% relative humidity, 5 cm of the adhesive strip were pulled off at a speed of 300 mm/minute at an angle of 180°. The average force required was measured and the values given are in each case average values from 5 individual measurements.

(d) Shear-Resistance:

An area of 2.5 cm×2.5 cm of a 5 cm long and 2.5 cm wide adhesive strip was placed, without forming air pockets, on a carefully cleaned glass plate so that the remainder of the adhesive strip projected over the edge of the glass plate. A 2.2 kg steel roller coated with silicon rubber was rolled over the strip 5 times backwards and forwards to press it onto the plate. After an adhesion time of 8 minutes, the glass plate was secured in a mounting at an angle of 2° from the vertical to reliably exclude peeling forces so that the free end of the adhesive strip hung downwards. At this end, a free hanging 2 kg weight was secured and the free end of the adhesive strip and the back of the glass plate formed between them an angle of 178°. The time taken for the adhesive strip to detach itself from the glass plate under the pull of the weight was measured in an air-conditioned room at 23° C. and 50% relative humidity. The values given are in each case average values from 3 individual measurements. The measurement was repeated at 50° C. using a 1 kg weight.

For all the measurements, the adhesive dispersions being tested were applied to the carrier sheets using a doctor blade with a thickness such that after drying, a uniform polymer layer of from 24 to 26 g/m2 remained. The glass surfaces used in the tests were cleaned by mechanically removing visible dirt with water and, where appropriate, cleaning agents and then were stored in an acetone bath. Before the test surfaces cleaned in this way were used, the plates were stored for at least 48 hours in a standard atmosphere of 23° C./50% relative humidity. In the following examples, all percentage data relate to the weight, unless otherwise indicated.

In the following examples there are described several preferred embodiments to illustrate the invention. However, it should be understood that the invention is not intended to be limited to the specific embodiments.

COMPARISON TEST A 3,400 g of demineralized water, 30 g of an alkyl-sulfonate of 15 carbon atoms, 200 g of a nonylphenolpolyglycol ether having 23 glycol units (on average) and 9 g of sodium vinyl sulfonate were introduced into a 16 liter stirred autoclave and 2,000 g of vinyl acetate and 1,000 g of 2-ethyl-hexyl acrylate were incorpoated by emulsifying. The mixture was heated to 50° C. and ethylene was introduced to a pressure of 50 bar. Polymerization was started and maintained by simultaneously metering in 70 ml/h of an 8% ammonium persulfate solution and 70 ml/h of a 4% sodium formaldehyde sulfoxylate solution.

When polymerization had started (pressure increase to 54 bar), 2,000 g of 2-ethylhexyl acrylate and 125 g of acrylic acid were added continuously over a period of 3 hours. The metering in of the redox components were then continued for a further 2 hours after which the ethylene pressure had fallen to 43 bar. After cooling and release of the pressure, there resulted a stable dispersion having a solids content of 57.2%, a viscosity of 184 mPa.s (Epprecht Rheometer STV, B III), a K value (according to Fikentscher, Cellulosechemie volume 13, page 58, 1932; measured in 1% tetrahydrofuran solution) of 81 and an ethylene content of the polymer of 11.8%.

COMPARISON TEST B

The process of Comparison Test F was repeated using 62 g of acrylamide in the initial polymerization batch. There resulted a dispersion having a solids content of 57.3%, a viscosity of 7,600 mPa.s (Epprecht Rheometer STV, D III), a K value of 88 and an ethylene content of the polymer of 14.7%.

EXAMPLE 1

94 kg of demineralized water, 0.75 kg of alkylsulfonate of 15 carbon atoms, 5 kg of the nonylphenolpolyglycol ether from Comparison Test A, 0.2 kg of sodium vinyl sulfonate, 0.62 kg of acrylamide and 1.24 kg of acrylic acid were introduced into a 400 liter stirred autoclave and 49.6 kg of vinyl acetate and 15 kg of 2-ethylhexyl acrylate were incorporated by emulsifying.

The start of polymerization and its continuation were effected by simultaneously metering in 0.8 liters/h of a 7% ammonium persulfate solution and 0.8 liters/h of a 3.5% sodium formaldehyde sulfoxylate solution. When polymerization had started a mixture of 55.7 kg of 2-ethylhexyl acrylate, 1.86 kg of acrylic acid and 6.2 kg of 2-hydroxyethyl acrylate were added over a period of 4 hours. The redox components were then metered in for a further 6 hours after which the ethylene pressure fell to 37 bar. After cooling and release of the pressure, there resulted a dispersion having a solids content of 58.8%, a viscosity of 8,680 mPa.s (Epprecht Rheometer STV, D III), a K value of 100 and an ethylene content of the polymer of 13.3%.

COMPARISON TEST C 4,940 g of demineralized water, 40 g of an alkylsulfonate of 15 carbon atoms and 70 g of the nonylphenol ether from Comparison Test A, 11 g of sodium vinyl sulfonate, 70 g of acrylic acid and 17 g of acrylamide were introduced into a 16 liter stirred autoclave and 2,760 g of vinyl acetate and 830 g of 2-ethylhexyl acrylate were incorporated by emulsifying. The mixture was heated to 50° C. and ethylene was introduced to a pressure of 50 bar.

The start of polymerization and its continuation were effected by simultaneously metering in 20 ml/h of a 10% ammonium persulfate solution and 20 ml/h of a 5% sodium formaldehyde sulfoxylate solution. When polymerization had started, a mixture of 3,410 g of 2-ethylhexyl acrylate and 104 g of acrylic acid and a solution of 210 g of the above nonylphenolpolyglycol ether in 860 g of demineralized water were added continuously over a period of 9 hours. The metering-in of the redox components was then continued for a further 5 hours after which the ethylene pressure had dropped to 40 bar. After cooling and release of the pressure, there resulted a dispersion having a solids content of 54.5%, a viscosity of 810 mPa.s (Epprecht Rheometer STV, C III), a K value of 95.6 and an ethylene content of the polymer of 18.3%.

EXAMPLE 2

Comparison Test C was repeated but 415 g of 2-hydroxyethyl acrylate were additionally added to the metered monomers. There resulted a dispersion having a solids content of 53.0%, a viscosity of 1,126 mPa.s (Epprecht Rheometer STV, C III), a K value of 92.5 and an ethylene content of 18.3%.

COMPARISON TEST F 4,100 g of demineralized water, 38 g of an alkylsulfonate of 15 carbon atoms, 250 g of a nonylphenolpolyglycol ether (as in Comparison Test A), 31 g of acrylamide and 10 g of sodium vinyl sulfonate were introduced into a 16 liter stirred autoclave and 2,480 g of vinyl acetate and 750 g of 2-ethylhexyl acrylate were incorporated by emulsifying. The mixture was heated to 50° C. and saturated with ethylene to 50 bar. The start and continuation of the polymerization were effected by simultaneously metering in 50 ml/h of 10% ammonium persulfate solution and 50 ml/h of a 5% sodium formaldehyde sulfoxylate solution.

When polymerization had started, a mixture of 2,970 g of 2-ethylhexyl acrylate, 124 g of acrylic acid and 310 g of 2-hydroxy-ethyl acrylate was metered in over a period of 3 hours. The metering-in of the redox components was then continued for an additional 4 hours after which the ethylene pressure dropped to 44 bar. After cooling and release of the pressure, there resulted a stable dispersion having a solids content of 59.3%, a viscosity of 1,098 mPa.s (Epprecht Rheometer STV, C III), a K value of 89 and an ethylene content of the polymer of 13%.

The results of the measurements are listed in the following Table 1.

TABLE 1

Test values of dispersion coatings having a dry film thickness of approximately 25μ on 100μ soft PVC sheets

| Dispersion from Example or Comparison test | Resistance to peeling under the action of heat (minutes/cm) at 50° C. | Surface adhesiveness (N/2.5 cm) | Resistance to peeling (N/2.5 cm) on glass after an adhesion time of | | Shear-resistance (minutes) | |
|---|---|---|---|---|---|---|
| | | | 8 mins. | 24 hours | 23° C. | 50° C. |
| A | 1000 K | — | — | — | 107 K | 17 K |
| F | 4000 A | 9.7 | 6.2 A | 9.5 A | 1550 K | 200 K |
| B | 16 A | 10.1 | 6.1 A | 9.6 A | 3000 K | 500 K |
| 1 | 13000 A | 9.8 | 6.2 A | 9.9 A | 5000 K | 3000 K |
| C | 4600 AK | 7.5 | 6.7 A | 17.4 A | 3300 K | 290 K |
| 2 | >20000 A | 6.9 | 6.4 A | 17.3 A | 2800 K | 2400 K |

A = adhesive break
K = cohesive break

The results of the table clearly show the improved properties of the adhesive film formed by the aqueous adhesive dispersion of the invention as compared to the prior art.

COMPARISON TEST D

The procedure of Comparison Example A was repeated except that additionally 310 g of 2-hydroxyethyl acrylate were added to the monomer mixture in the initial polymerization batch. There a dispersion resulted having a solids content of 55.2%, a viscosity of 9052 mPa.s (Epprecht Rheometer STV, C III), a K value of 88 and an ethylene content of the polymer of 14.7%. Standing some weeks, thickening of the dispersion occurred.

COMPARISON TEST E

The procedure of Comparison Example A was repeated with the difference that 90 g of acrylic acid were added to the monomer mixture in the initial polymerization batch without metering in or acrylic acid during polymerization. There a dispersion resulted having a solids content of 56.6%, a viscosity of 9344 mPa.s (Epprechst Rheometer STV, C III), a K value of 95 and an ethylene content of the polymer of 10.5%. The coating obtained with the dispersion showed an "orange peel effect". Standing some weeks, thickening of the dispersion occurred.

mixture in the initial polymerization batch, 34 g of acrylamide were metered in during polymerization. There

COMPARISON TEST G

The procedure of Example 2 was repeated, but instead of adding 17 g of acrylamide to the monomer a dispersion resulted having a solids content of 56.6%, a viscosity of 711 mPa.s (Epprecht Rheometer STV, C III), a K value of 83 and an ethylene content of the polymer of 16%.

The tests determinating the peeling resistance under the action of heat, the surface adhesiveness, the peel strength (adhesive strength) and the shear-resistance of the above dispersions were the same as disclosed above. In the enclosed table, the test values of the dispersions according to Comparison Tests D, E and G are summarized in comparison with the test values of the dispersions from the other examples of the application.

Various modifications of the products and process of the invention may be made without departing from the

TABLE

Test values of dispersion coatings having a dry film thickness of approximately 25μ on 100μ soft PVC sheets

| Dispersion from Example or Comparison test | Resistance to peeling under the action of heat (minutes/cm) at 50° C. | Surface adhesiveness (N/2.5 cm) | Resistance to peeling (N/2.5 cm) on glass after an adhesion time of | | Shear-resistance (minutes) | |
|---|---|---|---|---|---|---|
| | | | 8 mins. | 24 hours | 23° C. | 50° C. |
| A | 1000 K | — | — | — | 107 K | 17 K |
| F | 4000 A | 9,7 | 6,2 A | 9,5 A | 1550 K | 200 K |
| B | 16 A | 10,1 | 6,1 A | 9,6 A | 3000 K | 500 K |
| 1 | 13000 A | 9,8 | 6,2 A | 9,9 A | 5000 K | 3000 K |
| C | 4600 AK | 7,5 | 6,7 A | 17,4 A | 3300 K | 290 K |
| 2 | >20000 A | 6,9 | 6,4 A | 17,3 A | 2800 K | 2400 K |
| D | 2650 K | 9,8 | 4,6 A | 8,9 A | 538 K | 88 K |
| E | 500 K | 7,4 | 3,6 A | 5,7 A | 105 K | 27 K |
| G | >20000 A | 4,6 | 7,3 A | 10,9 A | 437 K | 135 K |

A = adhesive break
K = cohesive break spirit or scope thereof and it is to be understood that the invention is intended to be limited only as defined in the appended claims.

What we claim is:

1. An aqueous adhesive dispersion containing, based on the total weight of the dispersion, 40 to 65% by weight of a copolymer formed by radical copolymerization of ethylene, acrylic esters having alkyl groups of 4 to 12 carbon atoms, vinyl acetate, ethylenically unsaturated carboxylic acids, ethylenically unsaturated hydroxyalkyl functional compounds, (meth-)-acrylamide and, optionally, other mono- or poly-ethylenically unsaturated compounds, using emulsion polymerization and having a glass-transition temperature of from −20° to −60° C. and a K value of from 50 to 180 characterized in that the copolymer was produced from:
(a) 5 to 25% by weight of ethylene,
(b) 95 to 75% by weight of comonomer mixture comprising
  (b1) 40 to 64% by weight of acrylic ester(s),
  (b2) 33 to 55% by weight of vinyl acetate,
  (b3) 1 to 5% by weight of ethylenically unsaturated carboxylic acids,
  (b4) 1 to 8% by weight of ethylenically unsaturated hydroxyalkyl functional compounds,
  (b5) 0.05 to 0.8% by weight of at least one member of the group consisting of acrylamide and methacrylamide
  (b6) 0 to 2% by weight of other mono- or polyethylenically unsaturated compounds
in the presence of 1–6% by weight, based on the comonomer mixture, of emulsifier with not more than 50% of component (b1) being initially added and all of (b5) is initially added and each of components (b2) and (b3) being introduced all initially or is partially metered in and all of component (b4) is metered in during the polymerization.

2. The aqueous adhesive dispersion of claim 1 wherein the acrylic ester is at least one member selected from the group consisting of n-butyl acrylate and 2-ethylhexyl acrylate.

3. The aqueous adhesive dispersion of claim 1 wherein the ethylenically unsaturated carboxylic acid is at least one member selected from the group consisting of acrylic acid and methacrylic acid.

4. The aqueous adhesive dispersion of claim 1 wherein the hydroxyalkyl functional compound is at least one member selected from the group consisting of 2-hydroxyethyl acrylate and 2-hydroxypropyl acrylate.

* * * * *